United States Patent [19]
Ott

[11] Patent Number: 5,170,452
[45] Date of Patent: Dec. 8, 1992

[54] FIBER OPTIC PLUG CONNECTOR AND ADAPTER THEREFOR

[75] Inventor: Conrad Ott, Lake Grove, N.Y.

[73] Assignee: Porta Systems Corp., Syosset, N.Y.

[21] Appl. No.: 756,608

[22] Filed: Sep. 9, 1991

[51] Int. Cl.$^5$ .............................. G02B 6/36
[52] U.S. Cl. ...................... 385/60; 385/56; 385/72
[58] Field of Search .............. 385/55, 56, 58, 60, 385/70, 72

[56] References Cited

U.S. PATENT DOCUMENTS

| | | | |
|---|---|---|---|
| 4,339,172 | 7/1982 | Leather | 385/56 X |
| 4,406,515 | 9/1983 | Roberts | 350/96.21 |
| 4,444,461 | 4/1984 | Wey et al. | 385/72 |
| 4,738,508 | 4/1988 | Palmquist | 350/96.21 |
| 4,881,792 | 11/1989 | Alameel et al. | 385/56 |
| 4,892,379 | 1/1990 | Takeda et al. | 385/60 |
| 4,934,785 | 6/1990 | Mathis | 350/96.21 |
| 5,031,981 | 7/1991 | Peterson | 385/56 |
| 5,073,042 | 12/1991 | Mulholland et al. | 385/69 |

*Primary Examiner*—Frank Gonzalez
*Attorney, Agent, or Firm*—Charles E. Temko

[57] ABSTRACT

A fiber optic plug connector for single fiber jacketed conductors and a corresponding jack type adapter supported in a bulkhead and adapted to receive a corresponding plug on an opposite side of the bulkhead in aligned relation. The plug connector incorporates means for maintaining both axial and rotational alignment of an engaged conductor with respect to a corresponding fiber container with which it is placed in abutted relation to assure maximum transmission therethrough. A novel adapter construction is also disclosed.

3 Claims, 5 Drawing Sheets

FIG.6
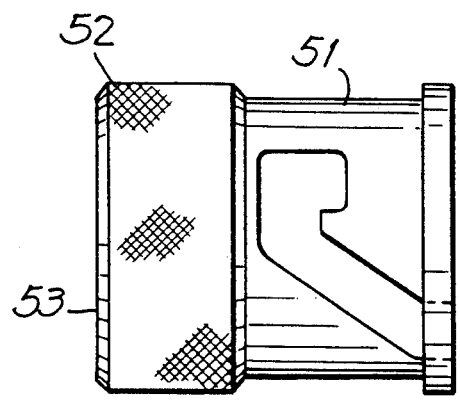
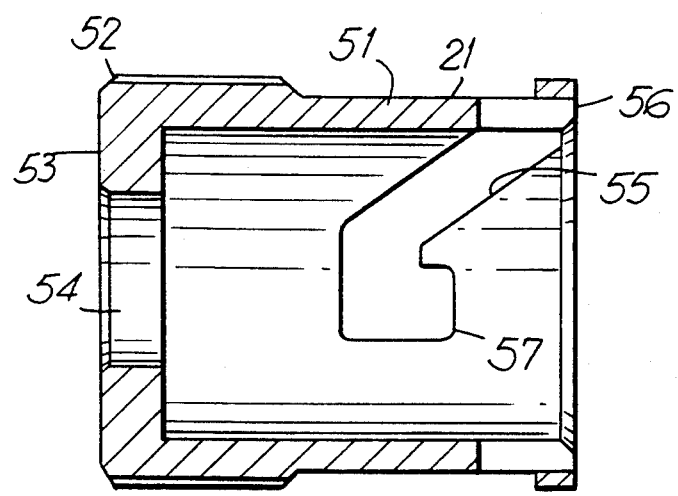
FIG.7
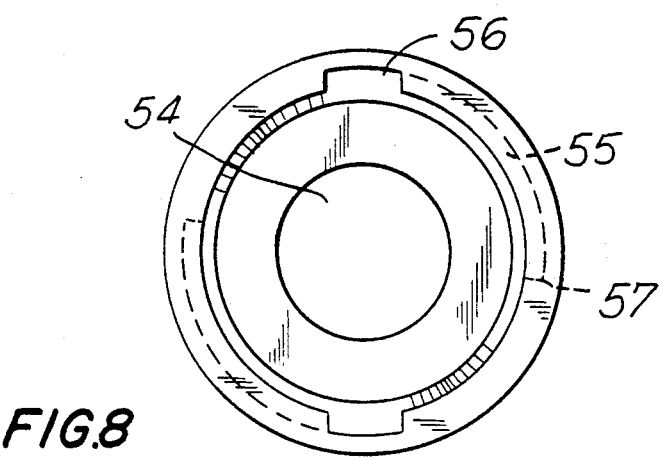
FIG.8

FIBER OPTIC PLUG CONNECTOR AND ADAPTER THEREFOR

BACKGROUND OF THE INVENTION

This invention relates generally to the field of fiber optic light transmission as used in telephonic and other forms of communication, and more particularly to an improved plug connector and corresponding adapter for use with jacketed cable. Devices of this general type are well known in the art, and are widely used in the field o telecommunication.

Optical fibers in the art normally include a core surrounded by a cladding, also made of optical fiber material, but having a different index of refraction, the core and cladding being enclosed in a flexible jacket of 3 mm. diameter. The core and cladding have a diameter which may be as little as 125 microns. In order to have maximum light transmission between the terminated ends of a pair of communicating cables, alignment both axially and radially of the axis of the cables must be extremely precise, and as close to a coaxial condition as possible. Depending upon the quality of transmission required, these fibers may be used in either single mode or multimode operation.

The advantages of fiber optic transmission are well appreciated in the art, and need not be further elaborated in the present disclosure. However, the problems involved in the finished ends of a pair of optical cables are equally well known, and relate largely to the problem of precise adjustment of the fibers for maximum light transmission therethrough. These problems have been resolved using a variety of coupling constructions, a very commonly used typing of the so-called ST connector. In this construction, each terminated fiber cable is carried by a plug type element, each plug being selectively engaged with a so-called adapter which engages a plug element at either end thereof. The adapter is commonly mounted within an opening in a bulkhead or other wall, and includes means for fixing the adapter against rotation with respect to the bulkhead.

Not surprisingly, the need for a high order of precision is accompanied by higher cost of manufacture. Where interconnections of fiber cables are made in a telephone central office, this added cost may be readily absorbed. Many such interconnections are made as a part of local area networks, or as part of an individual subscriber line where considerations of cost at the time of installation are of significant moment.

SUMMARY OF THE INVENTION

Briefly stated, the invention contemplates the provision of an improved fiber optic plug construction and accompanying adapter in which the number of parts, the cost of producing the same, and the cost of assembling them has been significantly reduced when compared to prior art devices. Moreover, the improved construction may be assembled with the use of relatively simple hand tools employed by workers having relatively ordinary skills. These advantages significantly reduce the total cost of manufacture.

BRIEF DESCRIPTION OF THE DRAWINGS

In the drawings, to which reference will be made in the specification, similar reference characters have been employed to designate corresponding parts throughout the several views.

FIG. 6 is a side elevational view of a coupling sleeve.

FIG. 7 is a longitudinal sectional view of the coupling sleeve.

FIG. 8 is an end elevational view thereof.

DETAILED DESCRIPTION OF THE DISCLOSED EMBODIMENT

Figure 1:
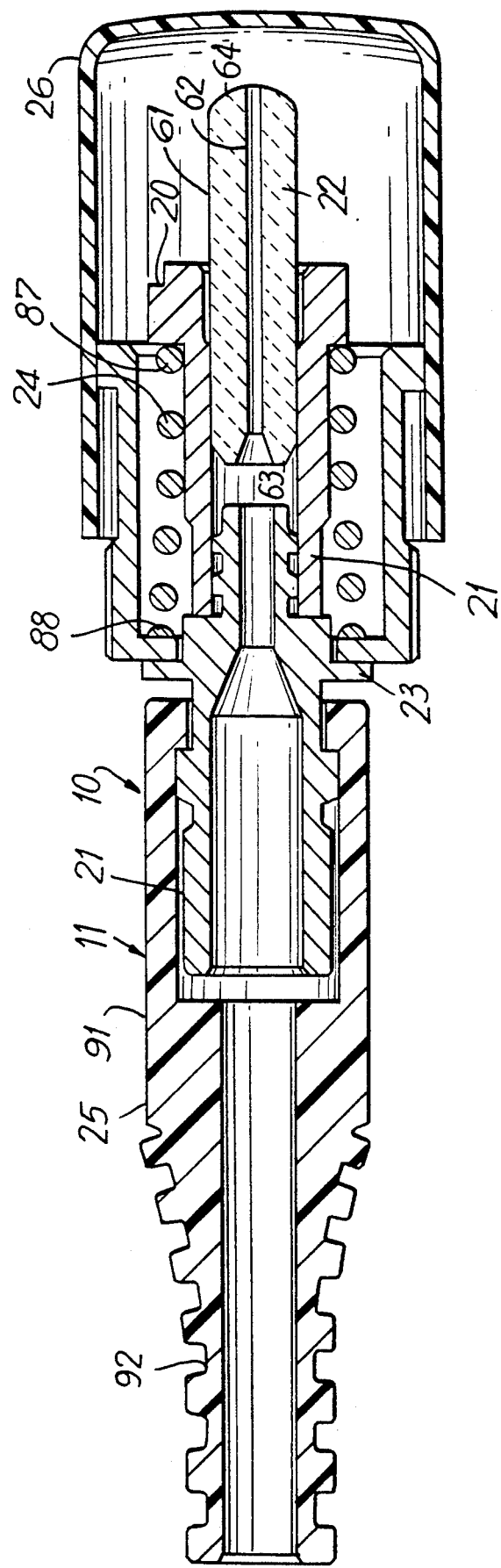
FIG. 1 is a longitudinal central sectional view of an embodiment of the invention.

In accordance with the invention, the device, generally indicated by reference character 10, comprises broadly, a pair of plug type connector elements, one of which is indicated by reference character 11, and an adapter element 12.

The connector element 11 includes a front body element 20 including a coupling sleeve 21, a ceramic ferrule 22, a rear body element 23, a coil spring 24, a bend relief 25 and a protective cap 26.

Figure 2:
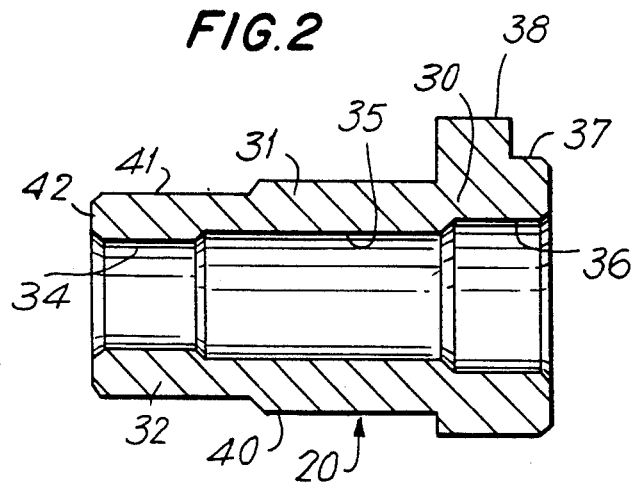
FIG. 2 is an enlarged longitudinal sectional view of a front body element forming a part of the embodiment.
Figure 3:
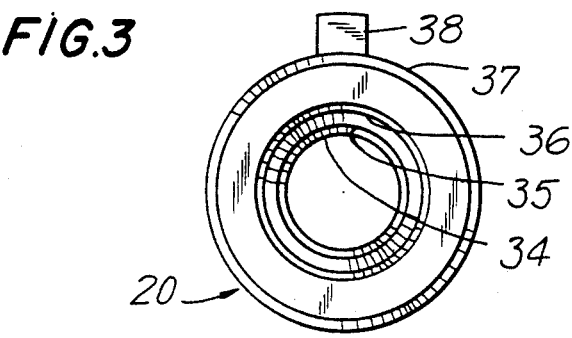
FIG. 3 is an end elevational view of the front body element.
Figure 4:
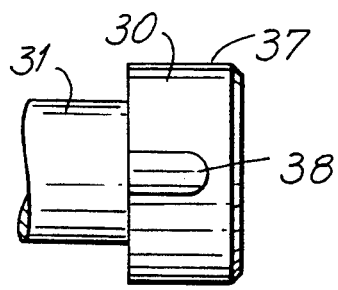
FIG. 4 is a fragmentary top plan view thereof.
Figure 5:
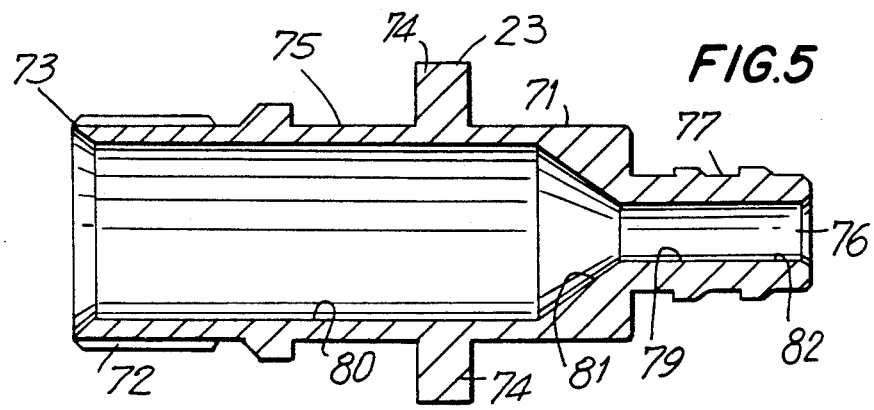
FIG. 5 is a longitudinal central sectional view of a rear body element forming another part of the embodiment.

Referring to FIG. 2 the front body element 20 is preferably formed as a zinc die casting, and includes a longitudinally extending tube 30 having an outer end member 31 including a tubular extension 32. The end member 31 is bounded by an end surface 33 from which a first bore 34, and second and third counter bores 35 and 36 extend. An outer surface 37 mounts an alignment lug 38 thereon.

The extension 32 is bounded by first outer surface 40 and a second outer surface 41 which extends to a chamfered end 42.

The coupling sleeve 21 (FIG. 7) is also preferably formed as a precision die casting, and includes a tubular wall 51 having a manually engagable end 52 and an end wall 53 defining a central opening 54. A pair of bayonet slots, one of which is indicated by reference character 55 includes an end opening 56 and a locking inner terminal 57, this structure being conventional in the art.

The ferrule 22 is preferably of entirely ceramic construction, and includes a cylindrical outer surface 61 having a centrally disposed bore 62 terminating at one end thereof in a chamfered surface 63 as well as a rounded outer end 64.

The rear body element 23 is preferably, again, a die casting, and includes a main body member 71 having a ribbed extension 72 on a first end thereof 73. A radially extending flange 74 extends from an outer cylindrical surface 75. A rearwardly extending sleeve 76 is bounded by an outer cylindrical surface 77 forming a mounting groove for the bend sleeve 25. It includes a through bore 79 including a larger portion 80, a conical portion 81 and a smaller portion 82 to accommodate a fiber optic cable (not shown) and a bared fiber.

The coil spring 24 is conventional, including first and second ends 87 and 88 which bear respectively against portions of the front body element 20 and coupling sleeve 21 in known fashion.

The bend relief 25 is preferably molded from a flexible synthetic resinous material. It includes a tubular portion 91 which engages the rear body element 23 and a flexible cable engaging portion 92 which provides a strain relief function.

The cap 26 may be in the form of a simple injection molded part which resiliently engages the outer end of the coupling sleeve.

Referring to FIG. 1 in the drawing, the parts are conveniently assembled using a fixture base (not shown). First, the rear body element entity is engaged with the fixture in vertical orientation. Next, the coupling sleeve 21 is slid onto the rear body element until seated against rear body flange. The spring 24 is next dropped into the coupling sleeve and over the rear body element, followed by press fitting the front body element onto the rear body element until seated, making sure that the front body element slides onto the spring freely. Next, the ferrule 22 is press fit into the front body element followed by installation of the cap 26.

It will be noted that the construction disclosed completely eliminates the use of resilient snap rings or similar devices, the engagement of which often calls for considerable manual dexterity as well as specialized tools.

Figure 9:
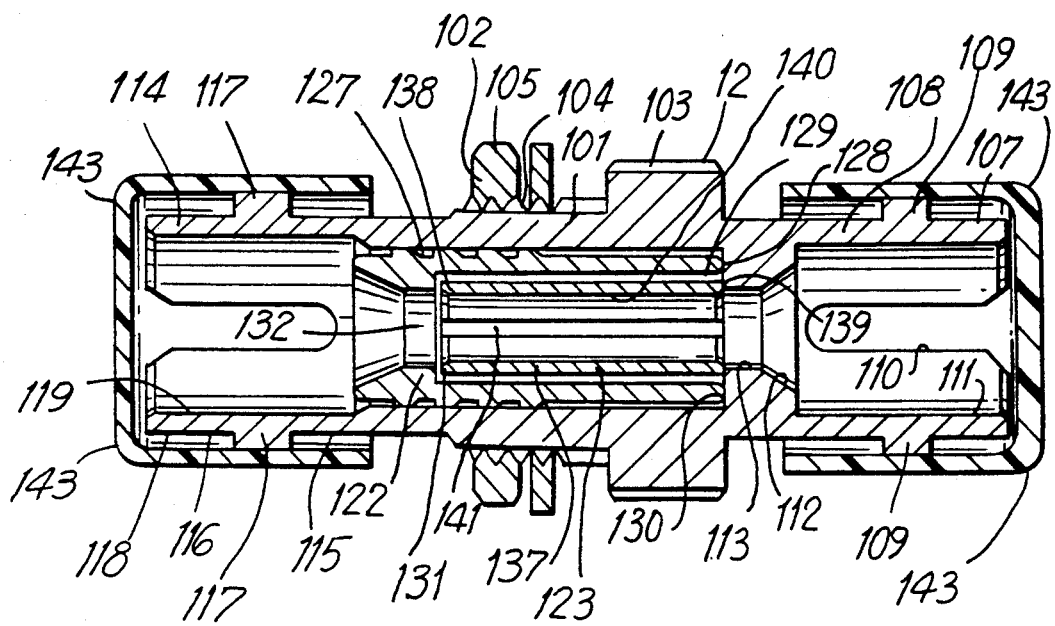
FIG. 9 is a longitudinal sectional view showing a connector elements in fully assembled condition.
Figure 10:
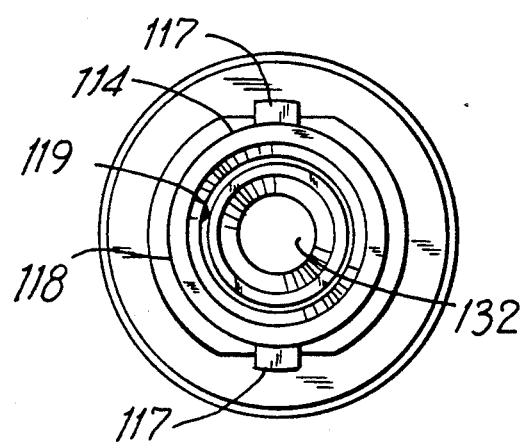
FIG. 10 is an end elevational view as seen from the left-hand portion of FIG. 9 with a protective cap removed for purposes of clarity.

Referring to FIG. 9, the adapter element 12 is, again, a zinc die casting, and includes a main body 101 having an outer surface 102 from which a flange 103 radially extends. A threaded segment 104 is engageable with a corresponding nut 105 for retaining the body 101 in fixed relation within an opening in a bulkhead (not shown) in well known manner. A first end 107 forms a hollow extension 108 having bayonet lugs 109. An alignment slot 110 selectively engages the lug 38 upon engagement of a plug element. A central bore 111 communicates with a conical bore 112 and a smaller bore 113.

A second end 114 is similarly configured, and forms a hollow extension 115 which accommodates a second plug element not shown). It includes an outer surface 116 mounting a pair of bayonet lugs 117 adjacent the outer portion 118 thereof and forming a bore 119 for the plug element.

Figure 11:
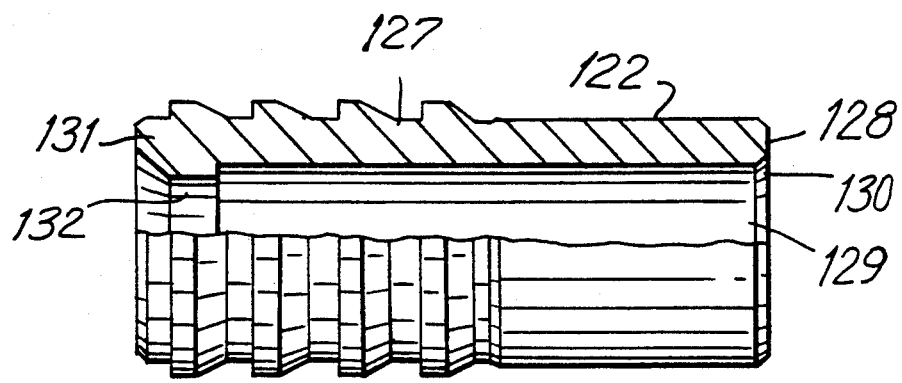
FIG. 11 is a longitudinal sectional view, partly in elevation, showing a bushing element comprising a part of the invention.
Figure 12:
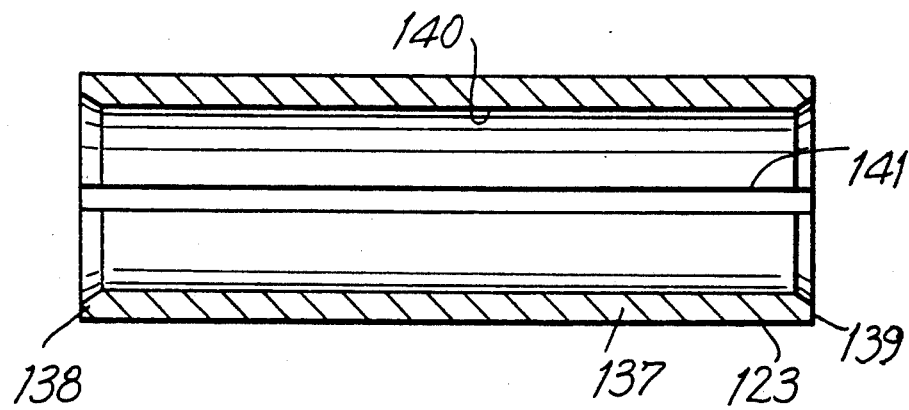
FIG. 12 is a longitudinal sectional view of an alignment sleeve forming a part of the disclosed embodiment.

A bushing element 122 (FIG. 11) is frictionally fitted within the main body 101, and supports an alignment sleeve (FIG. 12) 123. The element 122 is in the form of a tubular bushing, and includes an outer ribbed surface 127 terminating in a first end 128 having a centrally disposed bore 129 therethrough. The bore 129 includes a chamfered end 130 to facilitate engagement. A second end 131 leads to a cylindrical bore 132 which communicates with the alignment sleeve 123.

The sleeve 123 is formed from a resilient metallic material such as phosphor bronze. It includes a cylindrical body 137 having first and second chamfered ends 138 and 139 leading to a cylindrical bore 140. a longitudinally extending slot 141 permits radial expansion and performs a clamping function on the ceramic ferrules of each of the two engaged plug elements. The end caps 143 are similar to those employed with the plug elements, and are entirely conventional.

Assembly of the adapter element plug is a relatively simple matter. The operation involves only the fitting of the sleeve 135 within the bushing 122, and the frictional fitting of this member within the body 101. This operation can be performed manually, usually without the use of any tools whatsoever.

It may thus be seen that I have invented novel and highly useful improvements in ST type fiber optic couplings in which each of the elements involved can be readily assembled without the use of resilient snap rings, and by persons having only ordinary skills and relatively simple tools. For the most part, the construction is manufactured using precision die casting and metallic tubing, thus further reducing the cost of manufacture.

I wish it to be understood that I do not consider the invention to be limited to the precise details of structure shown and set forth in this specification, for obvious modifications will occur to those skilled in the art to which the invention pertains.

I claim:

1. An improved optical plug connector comprising: a first body element including a cylindrical sleeve having an enlarged first end, and a hollow axially aligned through bore; a fiber engaging cylindrical ferrule supported in fixed relation within said bore; a second body element including a main body member having an axially aligned through bore and a first end extension having an outer cylindrical surface of diameter corresponding to the diameter of said through bore in said first body element; said first and second body elements being frictionally engaged by projecting said extension on said second body element into said bore in said first body element; a bayonet type coupling sleeve surrounding said first body element in sliding relation, and a coil spring interconnecting said coupling sleeve and said first body element and maintained in at least partially compressed condition by the engagement of said first and second body elements; said second body element having a second end having means thereon for selectively interconnecting with a fiber optic cable.

2. A plug connector in accordance with claim 1, said first end extension having annular ribs for facilitating the frictional engagement of said first and second body members, and providing superior mutual retention.

3. A plug adapter for use with fiber optic plug connectors, comprising: a main body defining a through bore extending between first and second ends thereof, said ends each having bayonet lugs on the outer surface thereof for engaging said connectors; said through bore including a centrally disposed portion thereof of lessor diameter than the end portions thereof; an elongated adapter bushing frictionally retained within said centrally disposed portion of said bore, said bushing having an axially disposed bore therein and an outer ribbed surface forming interstices permitting airflow during temperature changes in ambient air to reduce the possibility of relative radial dimensional changes during use; and a resiliently expandable alignment sleeve frictionally maintained within said centrally disposed bore, said sleeve defining a through passage for resiliently engaging a projecting fiber terminating ferrule on a plug connector.

* * * * *